US009718030B2

(12) United States Patent
Aburaya

(10) Patent No.: US 9,718,030 B2
(45) Date of Patent: Aug. 1, 2017

(54) METHOD FOR PRODUCING ACID GAS SEPARATION COMPOSITE MEMBRANE, AND ACID GAS SEPARATION MEMBRANE MODULE

(71) Applicant: FUJIFILM Corporation, Tokyo (JP)

(72) Inventor: Yoshihiro Aburaya, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 107 days.

(21) Appl. No.: 14/862,664

(22) Filed: Sep. 23, 2015

(65) Prior Publication Data
US 2016/0008765 A1 Jan. 14, 2016

Related U.S. Application Data

(63) Continuation of application No. PCT/JP2014/001844, filed on Mar. 28, 2014.

(30) Foreign Application Priority Data

Mar. 29, 2013 (JP) .................................. 2013-073884
Feb. 18, 2014 (JP) .................................. 2014-028350

(51) Int. Cl.
*B01D 53/22* (2006.01)
*B01D 67/00* (2006.01)
(Continued)

(52) U.S. Cl.
CPC ....... *B01D 67/0002* (2013.01); *B01D 53/228* (2013.01); *B01D 61/38* (2013.01);
(Continued)

(58) Field of Classification Search
CPC .. B01D 71/36; B01D 69/12; B01D 2257/504; B01D 2257/2045; B01D 2325/38;
(Continued)

(56) References Cited

U.S. PATENT DOCUMENTS 4,082,893 A * 4/1978 Okita .................. A61F 2/06
128/DIG. 14
4,234,535 A * 11/1980 Okita .................. A61F 2/06
264/127
(Continued)

FOREIGN PATENT DOCUMENTS

JP 7-60078 A 3/1995
JP 7-102310 B2 11/1995
(Continued)

OTHER PUBLICATIONS

Communication dated Mar. 8, 2016, issued by the Japan Patent Office in corresponding Japanese Application No. 2014-028350.
(Continued)

*Primary Examiner* — Anthony Shumate
(74) *Attorney, Agent, or Firm* — Sughrue Mion, PLLC

(57) ABSTRACT

Coating a hydrogel-state coating liquid containing at least a hydrophilic compound and an acid gas carrier on one surface of a hydrophobic porous body having three-dimensional network structure formed through intersecting, coupling or branching of a plurality of fibrils, and a large number of pores formed of microscopic interstices divided by the plurality of fibrils to form a facilitated transport membrane thereon. The hydrophobic porous body has an average inter-fibril distance of 0.001 μm or more and 2 μm or less inside a plane in parallel to a surface on which the acid gas separation facilitated transport membrane is formed, an average fibril length of 0.01 μm or more and 2 μm or less inside the plane, and an average inter-fibril distance of 0.001 μm or more and 2 μm or less in a direction perpendicular to the surface.

8 Claims, 7 Drawing Sheets

(51) Int. Cl.
  *B01D 69/12* (2006.01)
  *B01D 71/36* (2006.01)
  *B01D 61/38* (2006.01)
  *B01D 69/14* (2006.01)

(52) U.S. Cl.
  CPC .......... *B01D 69/12* (2013.01); *B01D 69/142* (2013.01); *B01D 71/36* (2013.01); *B01D 2053/221* (2013.01); *B01D 2257/2045* (2013.01); *B01D 2257/30* (2013.01); *B01D 2257/404* (2013.01); *B01D 2257/504* (2013.01); *B01D 2325/38* (2013.01); *Y02C 10/10* (2013.01)

(58) Field of Classification Search
  CPC ............... B01D 61/38; B01D 67/0002; B01D 2257/404; B01D 2257/30; B01D 53/228; B01D 2053/221; B01D 69/142; Y02C 10/10
  See application file for complete search history.

(56) References Cited

U.S. PATENT DOCUMENTS

| | | | | |
|---|---|---|---|---|
| 5,474,824 | A * | 12/1995 | Martakos | A61F 2/06 428/131 |
| 9,186,622 | B1 * | 11/2015 | Ranjan | B01D 53/228 |
| 2002/0045041 | A1 * | 4/2002 | Dillon | B01D 67/0027 428/311.51 |
| 2004/0154986 | A1 * | 8/2004 | Cheng | B01D 67/003 210/650 |
| 2004/0168417 | A1 * | 9/2004 | Tanaka | B01D 39/1692 55/486 |
| 2005/0230856 | A1 * | 10/2005 | Parekh | B01D 19/0031 261/122.1 |
| 2009/0142638 | A1 * | 6/2009 | Katayama | B01D 67/0032 429/480 |
| 2009/0277141 | A1 * | 11/2009 | Abe | B01D 67/0027 55/528 |
| 2009/0301307 | A1 | 12/2009 | Sugiyama et al. | |
| 2010/0096317 | A1 * | 4/2010 | Morita | B01D 63/081 210/321.84 |
| 2011/0268959 | A1 | 11/2011 | Thottupurathu | |
| 2012/0234745 | A1 * | 9/2012 | Jerman | B01D 63/022 210/321.8 |
| 2013/0087500 | A1 | 4/2013 | Ishizuka et al. | |
| 2013/0267621 | A1 | 10/2013 | Sawada et al. | |
| 2013/0287678 | A1 | 10/2013 | Okada et al. | |
| 2014/0137740 | A1 | 5/2014 | Aburaya et al. | |
| 2014/0196840 | A1 * | 7/2014 | Ishii | B01D 71/36 156/244.11 |
| 2014/0290479 | A1 | 10/2014 | Okada et al. | |
| 2014/0352540 | A1 | 12/2014 | Okada et al. | |
| 2015/0273367 | A1 * | 10/2015 | Tanaka | B01D 63/02 210/190 |
| 2017/0015567 | A1 * | 1/2017 | Kashihara | B01J 20/28 |

FOREIGN PATENT DOCUMENTS

| | | |
|---|---|---|
| JP | 2008-36463 A | 2/2008 |
| JP | 2009-195900 A | 9/2009 |
| JP | 2011-231321 A | 11/2011 |
| JP | 2012-144717 A | 8/2012 |
| JP | 2012-206112 A | 10/2012 |
| JP | 2013-27841 A | 2/2013 |
| JP | 2013-53195 A | 3/2013 |
| WO | 2007125944 A1 | 11/2007 |
| WO | 2009/093666 A1 | 7/2009 |
| WO | 2011152145 A1 | 12/2011 |
| WO | 2012086836 A1 | 6/2012 |
| WO | 2013018538 A1 | 2/2013 |
| WO | 2013018659 A1 | 2/2013 |

OTHER PUBLICATIONS

Communication dated May 17, 2016, issued by the European Patent Office in corresponding European Application No. 14775616.7.
Communication dated Apr. 26, 2016, from the State Intellectual Property Office of the People's Republic of China in counterpart application No. 201480018493.X.
Communication dated Jun. 30, 2016, from the Japanese Patent Office in counterpart application No. 2014-28350.
Communication dated Sep. 20, 2016, from the Japanese Patent Office in counterpart application No. 2014-028350.
International Search Report for PCT/JP2014/001844 dated Jul. 15, 2014 [PCT/ISA/210].
Written Opinion of the International Search Authority for PCT/JP2014/001844 dated Jul. 15, 2014 [PCT/ISA/237].
Communication dated Dec. 13, 2016, from the State Intellectual Property Office of the P.R.C. in corresponding application No. 201480018493.X.
"Principle and Technology of Chemical Separation," edited by Xiaoling Hu and Ping Guan, Textbook for Colleges and Universities, Chemical Industry Press, 2006, pp. 183-184 (9 pgs. total).

\* cited by examiner

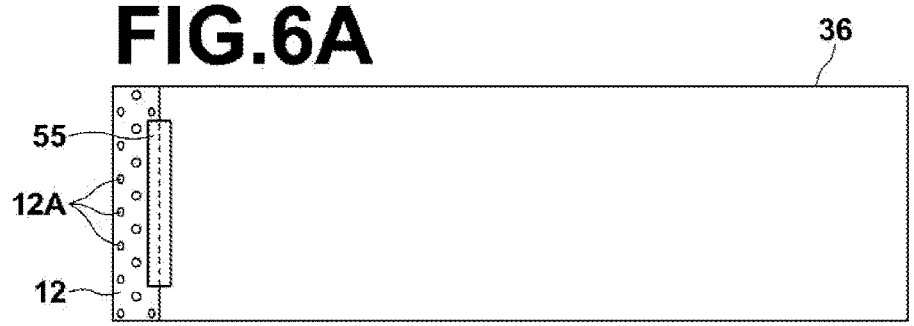
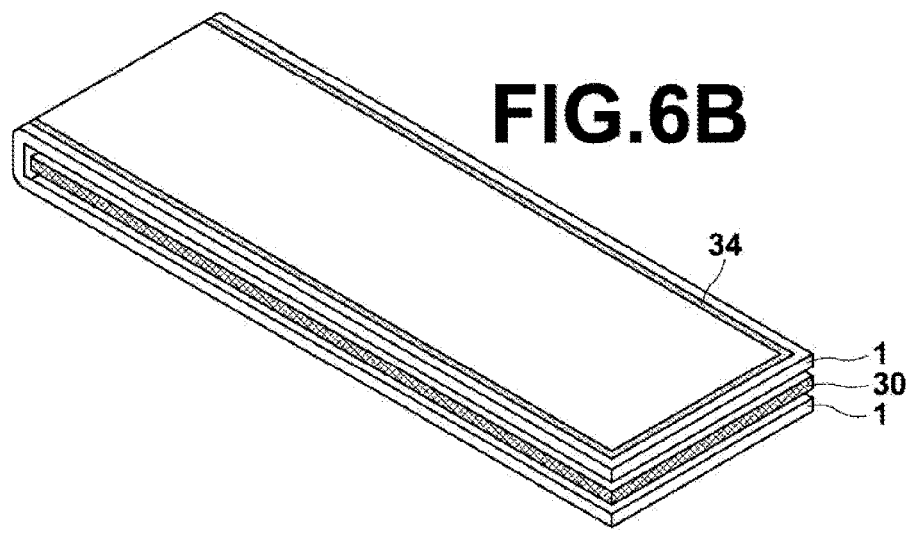
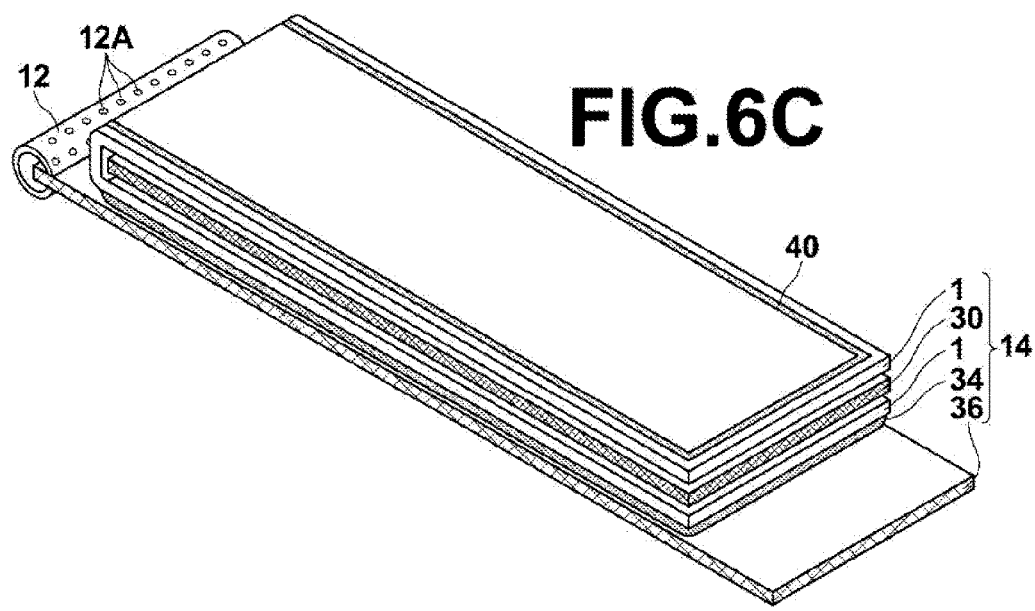

METHOD FOR PRODUCING ACID GAS SEPARATION COMPOSITE MEMBRANE, AND ACID GAS SEPARATION MEMBRANE MODULE

CROSS REFERENCE TO RELATED APPLICATIONS

The present application is a Continuation of PCT International Application No. PCT/JP2014/001844 filed on Mar. 28, 2014, which claims priority under 35 U. S. C. §119(a) to Japanese Patent Application No. 2013-073884, filed on Mar. 29, 2013, and Japanese Patent application No. 2014-028350, filed on Feb. 18, 2014. Each of the above applications is hereby expressly incorporated by reference in its entirety, into the present application.

BACKGROUND

The present disclosure relates to a method for producing an acid gas separation composite membrane, and an acid gas separation membrane module, in which an acid gas inside a gas to be separated is selectively separated by using a facilitated transport membrane.

In recent years, development has advanced in techniques for selectively separating an acid gas such as $CO_2$ inside a gas to be separated. For example, the development has been made on a module for gas separation for separating a $CO_2$ gas from the gas to be separated by a $CO_2$ gas separation membrane through which the $CO_2$ gas is selectively transmitted.

Gas separation membranes are generally classified into a facilitated transport membrane and a dissolution diffusion membrane. The facilitated transport membrane contains inside a membrane a substance (carrier) that selectively and reversibly reacts with one or a plurality of specific components inside the gas to be separated, and utilizes the carrier to transport the specific components on a side opposite to the membrane to cause separation. Moreover, the dissolution diffusion membrane utilizes differences in solubility in the membrane and diffusivity inside the membrane between the acid gas and a separation target substance.

The facilitated transport membrane utilizes transport based on a selective reaction between the specific component and the carrier. Thus, separation with high selectivity can be made, and a transmission rate of a separated gas inside the membrane is also high. Accordingly, the module for gas separation (facilitated transport type module for gas separation) in which the facilitated transport membrane is used has excellent separation characteristics, and has attracted attention.

In general, the facilitated transport type module for gas separation is provided with a member for fed gas flow channel serving as a flow channel of the gas to be separated to be fed, a gas separation member (gas separation composite membrane) in which the facilitated transport membrane is retained on a porous body, and a member for transmitted gas flow channel serving as a flow channel of a transmitted gas that is transmitted through the facilitated transport membrane, and separated.

In the gas separation composite membrane that plays a role of separation performance in the module for gas separation, high separation performance and high durability, and also production adaptability thereof are required. As the facilitated transport membrane having high carrier retention or a production method therefor, a facilitated transport membrane in which the membrane is formed by impregnating a carrier into a porous polymer membrane or a hydrogel membrane is disclosed (see Patent Documents 1 to 3).

Japanese Unexamined Patent Publication No. 7(1995)-060078 (hereinafter, Patent Document 1) discloses a method for producing a facilitated transport membrane having excellent carbon dioxide separation performance and also excellent retention of a carbon dioxide carrier liquid, and even if the membrane is brought into contact with water, causing no easy reduction of membrane performance, in which a hydrophilic vinyl monomer vapor is brought into contact onto a support having a porous polymer membrane subjected to plasma treatment to form a hydrophilic polymer membrane thereon, and then the carbon dioxide carrier liquid is impregnated and retained thereinto through the hydrophilic polymer membrane.

Japanese Patent Publication No. 7(1995)-102310 (hereinafter, Patent Document 2) discloses a carbon dioxide separation device provided with a facilitated transport membrane that is formed by using as a support a hydrophilic porous membrane, and casting a copolymer gel containing a carbon dioxide carrier thereon. The Document describes that the hydrophilic porous membrane is used as the support to facilitate film formation and to fill pores in the porous membrane also with the copolymer gel, and therefore a carbon dioxide separation membrane having only a limited number of defects can be obtained.

Japanese Unexamined Patent Publication No. 2009-195900 (hereinafter, Patent Document 3) describes that an uncrosslinked copolymer liquid is coated onto a support, and then crosslinked to cause insolubilization in water, and then a carbon dioxide carrier aqueous solution is absorbed thereinto to allow production of a carbon dioxide separation membrane having excellent long-term stability and high shape retention.

SUMMARY

When a porous membrane is used as a support, and a liquid-state or gel-state coating liquid for a facilitated transport membrane is applied thereon, the coating liquid is easily permeated into the support due to capillary force, or even if the coating liquid results no permeation, a membrane surface is easily nonuniformized. In order to allow gas separation having satisfactory durability in use under a high pressure, high temperature and high humidity environment, in the facilitated transport membrane, permeation into micropores in a porous body, or nonuniformization on a surface thereof is preferably suppressed as much as possible. Under the high pressure, high temperature and high humidity environment, a high flow rate of a water vapor easily causes reduction of a viscosity term of a gel membrane over time or permeation of the gas separation membrane into the porous body of the gas separation membrane in association therewith.

In the production methods in the above-described Patent Document 1 and 3, no measures are taken at all against such permeation of the coating liquid into the support due to the capillary force. Moreover, in the method in Patent Document 2, the micropores in the support are positively filled with a gel of the facilitated transport membrane.

The present disclosure has been made in view of the above-described problems, and produces, in a method for producing an acid gas separation composite membrane produced by coating onto a porous body a coating liquid containing a raw material of a facilitated transport membrane to form a membrane, an acid gas separation composite membrane having satisfactory durability under the high temperature, high humidity and high pressure environment by suppressing permeation of the coating liquid into the porous body during membrane formation and nonuniformization on the surface of the facilitated transport membrane.

A method for producing an acid gas separation composite membrane of the present disclosure refers to the method for producing the acid gas separation composite membrane provided with, on a surface of a porous body having a hydrophobic porous body at least on one surface, a facilitated transport membrane containing at least a hydrophilic compound and an acid gas carrier that reacts with an acid gas inside a gas to be separated, including;

arranging of the hydrophobic porous body having three-dimensional network structure formed through intersecting, coupling or branching of a plurality of fibrils, and a large number of pores formed of microscopic interstices divided by the plurality of fibrils, in which, in the three-dimensional network structure, an average inter-fibril distance inside a plane in parallel to a surface having the facilitated transport membrane of the support is 0.001 μm or more and 2 μm or less, an average fibril length inside the plane is 0.01 μm or more and 2 μm or less, and an average inter-fibril distance in a direction perpendicular to the surface is 0.001 μm or more and 2 μm or less, preparing of a hydrogel-state coating liquid containing at least the hydrophilic compound, the acid gas carrier or the promoter, and applying of the coating liquid onto one surface of the hydrophobic porous body.

In the method for producing the acid gas separation composite membrane of the present disclosure, an average fibril diameter of the plurality of fibrils in the porous body is preferably 0.01 μm or more and 5 μm or less.

The average inter-fibril distance herein means an average value of distances between the fibrils existing on an x-y plane, the average fibril length means an average value of lengths of fibrils existing on the x-y plane in a similar manner, the average inter-fibril distance in the direction perpendicular thereto means an average distance between the fibrils in a z direction, and the average fibril diameter means an average value of diameters per fibril. As to measurement of the average inter-fibril distance, the average fibril length and the average fibril diameter, judgement is made from an image (surface SEM image) of a scanning electron microscope (SEM). The average inter-fibril distance in the direction perpendicular thereto is to be judged from a cross-sectional SEM image, or to be determined according to a ratio of contrast of the fibrils existing on an outermost surface to contrast of the fibrils existing in a lower layer by obtaining the surface SEM image.

Moreover, "hydrophobicity" herein means that a contact angle with water at room temperature (25° C.) is 80 degrees or more.

In the hydrophobic porous body, the contact angle with water at room temperature (25° C.) is preferably 100 degrees or more on the plane on which the acid gas separation facilitated transport membrane is disposed. Moreover, the hydrophobic porous body is preferably formed of a fluorine-based resin, and further preferably formed of polytetrafluoroethylene.

Moreover, the method for producing the acid gas separation composite membrane of the present disclosure preferably has a step of laminating a nonwoven fabric of resin fibers onto a rear surface of the porous body.

In the method for producing the acid gas separation composite membrane of the present disclosure, onto one surface of the hydrophobic porous body, the coating liquid is preferably applied through a hydrophobic intermediate layer having gas permeability. As such an intermediate layer, a silicone resin layer is preferred.

A module for acid gas separation of the present disclosure is a facilitated transport type module for acid gas separation in which a fed gas to be separated is separated into the acid gas and a remaining gas other than the acid gas, and the resultant gases are discharged therefrom, and provided with a member for a fed gas flow channel through which the gas to be separated and the remaining gas are transmitted, the acid gas separation composite membrane produced by the method for producing the acid gas separation composite membrane of the present disclosure, and a member for transmitted gas flow channel through which the acid gas that is resulted from a reaction with the acid gas carrier and transmitted through the acid gas separation composite membrane flows.

In the present disclosure, onto a surface of a porous body having on at least one surface a hydrophobic porous body in which, in three-dimensional network structure formed of fibrils, an average inter-fibril distance inside a plane in parallel to a facilitated transport membrane forming plane is 0.001 μm or more and 2 μm or less, and an average fibril length is 0.01 μm or more and 2 μm or less, and an average inter-fibril distance in a direction perpendicular to the plane is 0.001 μm or more and 2 μm or less, a coating liquid of a facilitated transport membrane is applied to produce an acid gas separation composite membrane. If the hydrophobic porous body having such structure is used, permeation of a hydrogel-state coating liquid into a support due to capillary force, and nonuniformization on a surface of a coated membrane are suppressed, and the facilitated transport membrane having high surface uniformity can be formed. Accordingly, according to the present disclosure, the acid gas separation composite membrane having satisfactory durability can be produced under a high temperature, high humidity and high pressure environment.

BRIEF DESCRIPTION OF THE DRAWINGS

FIG. 6A is a diagram showing a process for producing a spiral type module.

FIG. 6B is a diagram, subsequent to FIG. 6A, showing the process for producing the spiral type module.

FIG. 6C is a diagram, subsequent to FIG. 6B, showing the process for producing the spiral type module.

DETAILED DESCRIPTION OF THE PREFERRED EMBODIMENTS

"Method for Producing Acid Gas Separation Composite Membrane"

Figure 1A:
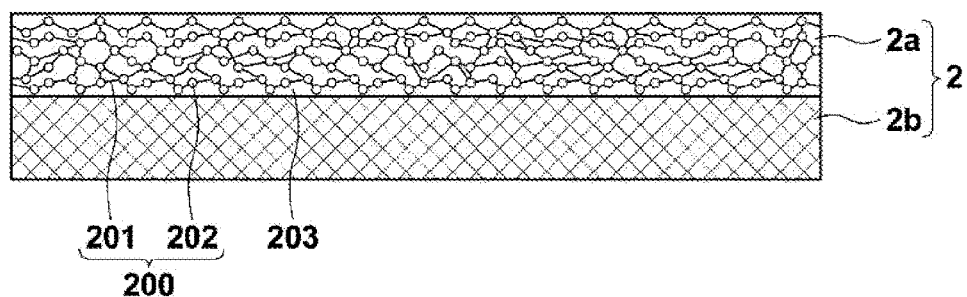
FIG. 1A is a schematic view showing a method for producing a gas separation composite membrane of one embodiment as related to the present disclosure.
Figure 1B:
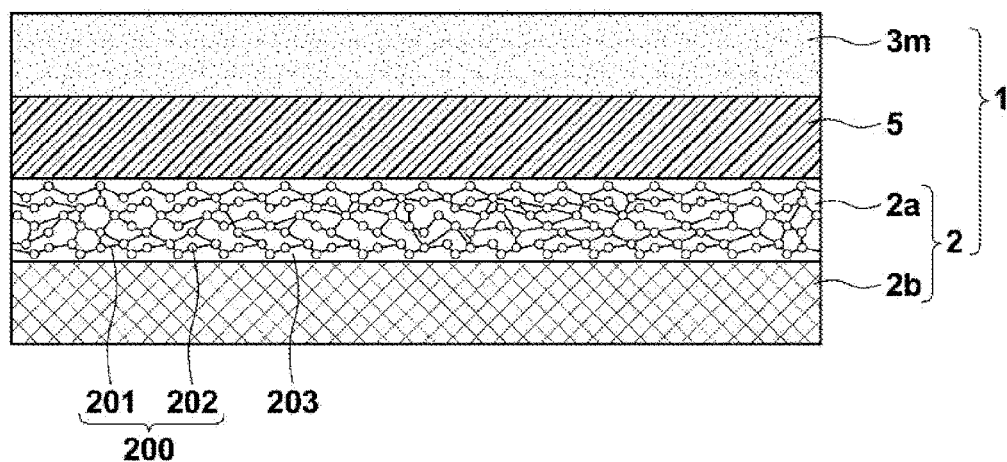
FIG. 1B is a schematic view, subsequent to FIG. 1A, showing the method for producing the gas separation composite membrane.
Figure 1C:
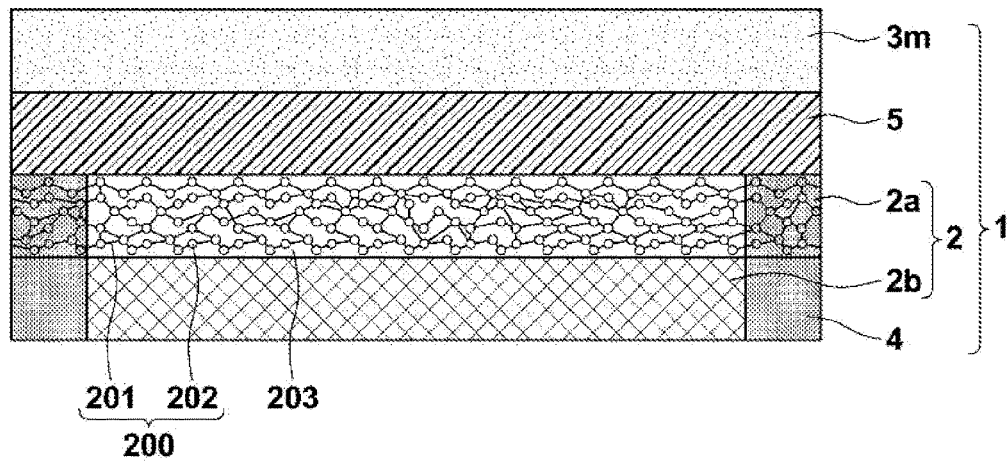
FIG. 1C is diagram showing a sealed portion in the gas separation composite membrane in FIG. 1B.

A method for producing an acid gas separation composite membrane of one embodiment as related to the present disclosure is described, referring to drawings. FIG. 1A to FIG. 1B are schematic cross-sectional views showing, according to a step, the method for producing the acid gas separation composite membrane as related to one embodiment of the present disclosure, and FIG. 1C is a diagram showing a sealed portion in FIG. 1B.

Figure 2:
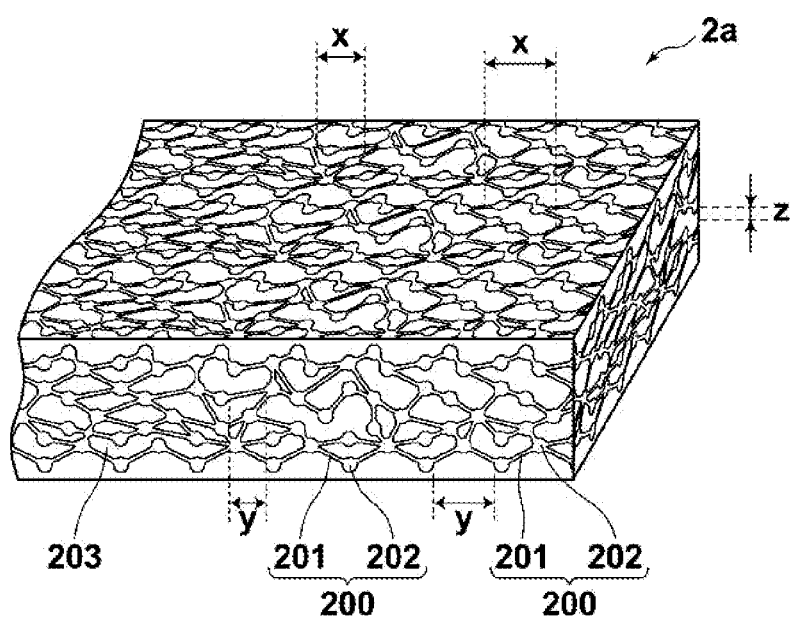
FIG. 2 is a perspective view schematically showing structure of a porous body of one embodiment as related to the present disclosure.

Moreover, FIG. 2 is a schematic perspective view showing structure of a porous body of the present embodiment. In drawings herein, a scale of each portion is appropriately changed and shown for facilitating visual observation.

As shown in FIG. 1B, an acid gas separation composite membrane 1 is provided with, on a surface of a porous support 2 having an auxiliary support 2b on a rear surface of a hydrophobic porous body 2a, a facilitated transport membrane 3m containing at least a hydrophilic compound (hydrophilic polymer), and an acid gas carrier that reacts with an acid gas inside a gas to be separated.

When the acid gas separation composite membrane 1 is processed into a spiral module as described later, the acid gas separation composite membrane 1 is folded into two, and interposes a flow channel (flow channel material) therebetween into a laminate, and the laminates are further laminated by interposing another flow channel. All of the flow channel and the laminate, and the laminate and the flow channel are sealed into an envelope form by the sealed portion using an adhesive. In FIG. 1C, a portion in which sealing is required (sealed portion) upon being processed into a module is shown in terms of a symbol 4, and is provided with the adhesive such as an epoxy resin having excellent heat resistance and hydrolysis resistance.

To the facilitated transport membrane 3 into which the hydrophilic compound and the acid gas carrier are incorporated, an additive is added, when necessary. Thus, even under an environment in operation as a module for acid gas separation, the membrane 3 serves as a hydrogel having an elastic modulus in the range of 0.01 MPa to 100 Mpa. The hydrogel having such an elastic modulus means a hydrogel having the elastic modulus within the above-described range as calculated from an inclination after conducting a tensile test conducted at 10 mm/min under an environment of 80° C. and a relative humidity of 60%, in consideration of an operating environment of an ordinary module for acid gas separation.

The present inventors have conducted study on structure of a hydrophobic porous body 2a, in which the hydrogel in the above-described range of the elastic modulus can be supported without causing permeation thereinside as much as possible, even under the environment of the high pressure environment and the environment in which the gas to be separated, the gas containing a high flow rate of water vapor (hereinafter, referred to as a high pressure and high humidity use environment), more specifically, high gas separation performance can be maintained by suppressing clogging of pores by an acid gas separating layer material, or defects in the separating layer as caused by intrusion of the acid gas separating layer material into the porous body. An expression "high gas separation performance can be maintained" means that selectivity for separating the acid gas in a state of the high pressure and high humidity use environment, and a flow rate of the separated acid gas show constant values over a long period of time.

As a result of study by the present inventors, the present inventors have found that, as a hydrophobic porous body 2a that carries a facilitated transport membrane 3, a support is used, as shown in FIG. 2, in which the support is provided with three-dimensional network structure 200 formed through intersecting, coupling or branching of a plurality of fibrils 201, and a large number of pores formed of microscopic interstices 203 divided by the plurality of fibrils 201, in the three-dimensional network structure 200, an average inter-fibril distance x inside a plane in parallel to a surface having the facilitated transport membrane 3 of the hydrophobic porous body 2a is 0.001 μm or more and 2 μm or less, an average fibril length y inside the plane is 0.01 μm or more and 2 μm or less, and an average inter-fibril distance z in a direction perpendicular to the surface is 0.001 μm or more and 2 μm or less, a hydrogel-state coating liquid 3m containing at least the hydrophilic compound, and the acid gas carrier is coated onto the surface of the hydrophobic porous body 2a to allow suppression of permeation of the hydrogel-state coating liquid into the support by capillary force and nonuniformization on the surface of a coated membrane to form the facilitated transport membrane 3 having high surface uniformity (see Examples described later).

According to the production method of the embodiment, the acid gas separation composite membrane 1 having satisfactory durability can be produced under the high temperature, high humidity and high pressure environment.

The method for producing the acid gas separation composite membrane that has been found by the present inventors is described in detail below.

<Preparation of Porous Body>

First, a porous support 2 having on at least one surface a hydrophobic porous body 2a is arranged (FIG. 1A). As shown in FIG. 1A, the porous support 2 only needs to have the hydrophobic porous body 2a and the facilitated transport membrane 3 as described above, but the porous support 2 preferably has higher strength under a high pressure and high humidity environment. Accordingly, as shown in FIG. 1A, the porous support 2 is preferably provided with an auxiliary support 2b on a rear surface of the hydrophobic porous body 2a.

The hydrophobic porous body 2a is not particularly limited, as long as the hydrophobic porous body 2a has the above-described structure. However, as shown in FIG. 1 (A to C) and FIG. 2, the three-dimensional network structure 200 having a plurality of fibrils generally has an aspect structured by the plurality of fibrils 201 and a plurality of bound portions (nodes) 202.

As described above, the hydrophobic porous body 2a is provided with the three-dimensional network structure 200 formed through intersecting, coupling or branching of the plurality of fibrils 201, and a large number of pores formed of microscopic interstices 203 divided by the plurality of fibrils 201, the average inter-fibril distance x inside the plane in parallel to one surface on which the acid gas separating layer 3 is disposed is 0.001 μm or more and 2 μm or less, and the average fibril length y inside the plane is 0.01 μm or more and 2 μm or less, and the average inter-fibril distance z in the direction perpendicular to the surface is 0.001 μm or more and 2 μm or less.

From a viewpoint of suppressing permeation of the hydrogel-state coating liquid 3m containing at least the hydrophilic compound and the acid gas carrier into the hydrophobic porous body 2a by the capillary force, the average inter-fibril distance x inside the plane on which the acid gas separating layer 3 is disposed, and the average inter-fibril distance z in the direction perpendicular to the plane are preferably shorter. If the average inter-fibril distances x and z are too long, a surface state of an applied gel membrane becomes nonuniform, and an increase in membrane defects and reduction of a membrane life in association therewith are easily caused, and an effect of suppressing permeation of the gel into the support under a high pressure tends to be low.

Accordingly, the average inter-fibril distance x is preferably 0.001 to 2 μm, further preferably 0.005μ to 1.5 μm, and still further preferably 0.01 to 1 μm. Moreover, the average inter-fibril distance z in the z direction is preferably 0.001 to 2 μm, further preferably 0.005μ to 1.5 μm, and still further preferably 0.01 to 1 μm.

Moreover, from a viewpoint similar to the above-described average inter-fibril distance, the average fibril length y inside the plane on which the acid gas separating layer 3 is disposed is preferably shorter. Accordingly, the average fibril length y is preferably 0.01 to 2 μm, further preferably 0.02 to 2 μm, and still further preferably 0.02 to 2 μm.

A shape of pores formed of the interstices 203 is not particularly limited, and a cross section thereof may have various kinds of structure such as a circle, an ellipse, a polygon and an infinite form, but accordingly as a size thereof is more uniform, the porous body has better permeability, and such a case is preferred.

In the hydrophobic porous body 2a, an average fibril diameter of the plurality of fibrils 201 is preferably 0.01 μm or more and 5 μm or less. Moreover, a fibril diameter is preferably 0.01 μm or more and 5 μm or less in 80% or more of all fibrils.

The fibril diameter is preferably as large as possible within the range in which the permeability is not adversely affected because supportability of hydrogel is high. Porosity of the hydrophobic porous body 2a is preferably 0.01% or more and 90% or less, and further preferably 0.1% or more and 85% or less because permeability and mechanical strength can be sufficiently secured.

A material of the hydrophobic porous body 2a is not limited at all, as long as the hydrophobic porous body 2a has a hydrophobicity. However, a contact angle between water and the plane on which the acid gas separating layer 3 is disposed is preferably 100 degrees or more. Specific examples of such a material include a fluorine-based resin, and polytetrafluoroethylene (PTFE) is preferred.

From a viewpoint of heat and moisture resistance, specific examples of the preferred material of the hydrophobic porous body 2a other than PTFE include an inorganic material such as ceramics, glass and metal, and an organic resin material having heat resistance of 100° C. or higher, and high-molecular-weight polyester, polyolefin, heat-resistant polyamide, polyimide, polysulfone, aramid, polycarbonate, polypropylene, metal, glass, ceramics or the like can be preferably used. More specifically, specific examples include ceramics, polyfluorovinylidene, polyether sulfone (PES), polyphenylene sulfide (PPS), polysulfone (PSF), polyimide, polypropylene (PP), polyetherimide and polyetheretherketone.

If the hydrophobic porous body 2a is too thick, gas permeability decreases, and if the hydrophobic porous body 2a is too thin, the strength is imperfect. Therefore, a thickness of the support is preferably 30 μm or more and 500 μm or less, further preferably 50 μm or more and 450 μm or less, and still further preferably 50 μm or more and 400 μm or less.

The method for producing the hydrophobic porous body 2a is not particularly limited, but in the case of PTFE, the hydrophobic porous body 2a can be easily produced by biaxially stretching PTFE due to stretching characteristics of PTFE. The hydrophobic porous body 2a can be produced so as to have desired fibril structure by optimizing conditions of biaxial stretching.

The hydrogel-state facilitated transport membrane 3 has poor affinity with the hydrophobic porous body. Therefore, as shown in International Patent Publication No. WO2009/093666 or the like, it has been considered to be necessary to apply hydrophilic treatment or the like to a surface of the porous body. The present inventors have formed the hydrophobic porous body into structure of the above-described three-dimensional network structure 200. Thus, the present inventors have first succeeded in directly supporting the hydrogel on the hydrophobic porous body with satisfactory durability without needing such treatment. The present inventors consider that the hydrophobic porous body having the above-described three-dimensional network structure 200 is formed to contribute to a capability of holding a hydrogel coating liquid (raw material of facilitated transport membrane) having a viscosity 0.1 Pa·s to 5.0 Pa·s as measured by a B type viscometer on the porous body in the range of a moderate contact angle (most preferably, 120 degrees to 140 degrees), and such a capability serves as a factor of the hydrogel being supportable directly on the hydrophobic porous body with satisfactory durability.

The auxiliary support 2b is not particularly limited, as long as strength, stretch resistance and gas permeability are satisfactory so that the auxiliary support 2b can bound the hydrophobic porous body 2a to suppress deformation of the hydrophobic porous body 2a under the high pressure and high humidity environment, and a nonwoven fabric, a woven fabric, a mesh having an opening diameter of 0.1 μm or more and 2,000 μm or less, or the like can be appropriately selected and used. However, a nonwoven fabric of resin fibers having excellent durability and heat resistance is preferred.

Specific examples of such resin fibers include fibers composed of a heat-resistant resin such as polypropylene, modified polyamide such as Aramid (trade name), and a fluorine-containing resin such as polytetrafluoroethylene and polyvinylidene fluoride.

If the auxiliary support 2b is too thick, the gas permeability decreases, and if the support 2b is too thin, the support 2b has an anxiety of difficulty in obtaining sufficient strength. Therefore, a thickness of the auxiliary support 2b is preferably 30 μm or more and 500 μm or less, further preferably 50 μm or more and 450 μm or less, and particularly preferably 50 μm or more and 400 μm or less.

Moreover, from viewpoints of sufficiently infusing an adhesive into the sealed portion 4 in an adhesive coating region to allow formation of an effective gas impermeable region and simultaneously causing no hindrance of gas passage in a region in which no adhesive is applied, an average pore diameter of openings of the auxiliary support 2b is preferably 0.001 μm or more and 200 μm or less, further preferably 0.002 μm or more and 200 μm or less, and particularly preferably 0.005 μm or more and 200 μm or less.

In the present disclosure, in order to further provide the membrane with mechanical strength, the support is preferably formed in a lower part of a supporting layer that forms a gas separating layer. Specific examples of the support include a woven fabric, a nonwoven fabric and a net, but in view of membrane-forming properties and cost, a nonwoven fabric is preferably used. As the nonwoven fabric, fibers composed of polyester, polypropylene, polyacrylonitrile, polyethylene, polyamide or the like may be used alone or in combination of a plurality thereof. For the purpose of removing fluff, improving mechanical properties, or the like, the nonwoven fabric is preferably interposed between two rolls and subjected to pressure heat processing.

<Intermediate Layer>

As already stated, in the porous support 2 (hydrophobic porous body 2a) of the acid gas separation composite membrane 1, from a viewpoint of suppressing penetration of a facilitated transport material during formation of the facilitated transport membrane, at least a surface on a side in contact with the facilitated transport membrane 3 has hydrophobicity. Moreover, in the facilitated transport membrane 3, in order to allow the carrier to sufficiently function, a large amount of moisture needs to be held inside the membrane, and therefore a polymer having significantly high water absorptivity and water retention is used. In addition thereto, in the facilitated transport membrane, accordingly as a content of the carrier such as metal carbonate is higher, an amount of water absorption increases and separation performance of the acid gas is improved. Therefore, the facilitated transport membrane 3 is a gel membrane or a membrane having low viscosity in many cases. Further, during separation of the acid gas, a raw material gas in a temperature of about 100 to 130° C. and a humidity of about 90% is fed under a pressure of about 1.5 MPa. Therefore, during use, the separating layer is gradually infiltrated (infused) into the porous support, and a capability of separating the acid gas tends to decrease over time.

Accordingly, the acid gas separation composite membrane 1 is preferably provided with, between the hydrophobic porous body 2a and the facilitated transport membrane 3, an intermediate layer 5 that further effectively suppresses the penetration of the facilitated transport material (membrane) into the porous support 2 (hydrophobic porous body 2a).

The intermediate layer 5 is not particularly limited, as long as the intermediate layer 5 is a hydrophobic layer having gas permeability, but is preferably a layer that has air permeability and is denser in comparison with the hydrophobic porous body 2a. The membrane has such an intermediate layer 5. Thus, the membrane having high uniformity can be formed by preventing the facilitated transport membrane 3 from infiltrating into the porous support.

The intermediate layer 5 only needs to be formed on the hydrophobic porous body 2a, but may have a penetration region that is penetrated into the hydrophobic porous body 2a. The penetration region is preferably as small as possible within the range in which adhesion between the hydrophobic porous body 2a and the intermediate layer 5 is satisfactory.

As the intermediate layer 5, a polymer layer having a siloxane bond inside a repeating unit is preferred. Specific examples of such a polymer layer include organopolysiloxane (silicone resin) and silicone-containing polyacethylene such as polytrimethylsilyipropyne.

Specific examples of the polyorganosiloxane preferably include straight-chain silicone such as polydimethylsiloxane (PDMS), polymethylphenylsiloxane and polymethylhydrogensiloxane, and modified silicone in which an amino group, an epoxy group, an alkyl halide group or the like is introduced into a side chain.

A silicone resin layer is preferably formed by coating and membrane formation. A coating liquid (silicone coating liquid) used for the membrane formation contains a monomer, a dimer, a trimer, an oligomer, a prepolymer or a mixture thereof of a compound serving as the silicone resin layer, and further may contain a curing agent, a curing promoter, a crosslinking agent, a thickener, a reinforcing agent or the like. Viscosity during coating the coating liquid is preferably 300 cp or more.

In addition, the silicone coating liquid preferably does not contain any organic solvent that is ordinarily used upon forming such a resin layer. The silicone coating liquid contains no organic solvent, which has advantages of eliminating necessity of a step for drying the silicone coating liquid to have a capability of curing of the monomer or the like immediately after the silicone coating liquid is coated, a capability of simplifying production facilities (capability of eliminating necessity of conversion into electricity discharging facilities or explosion-proof facilities), or the like.

Moreover, a surface of the intermediate layer 5 on a side of the facilitated transport membrane may be a smooth surface, but also may be a finely irregular surface. The intermediate layer 5 has fine irregularity on the surface. Thus, adhesion between the intermediate layer 5 and the facilitated transport membrane 3 can be improved. An aspect is formed through containing, in the silicone coating liquid, spherical or plate-shaped inorganic fine particles such as silica, aerosil, titania, alumina, carbon, boron nitride, talc and zeolite. Thus, the fine irregularity can be easily formed on the surface by coating and membrane formation. An average particle diameter of the inorganic fine particles is preferably in the range of 0.001 μm to 30 μm.

The intermediate layer 5 is a membrane having gas permeability, but if the intermediate layer 5 is too thick, has a possibility of significantly reducing the gas permeability. The intermediate layer 5 may be thin, as long as the intermediate layer 5 wholly and entirely covers the surface of the hydrophobic porous body 2a. If this regard is taken into consideration, a membrane thickness of the intermediate layer 5 is preferably 0.01 μm or more and 10 μm or less, and further preferably 0.1 μm or more and 5 μm or less.

<Preparation of Facilitated Transport Membrane>

Next, onto a surface on side of the hydrophobic porous body 2a of the porous support 2 obtained as described above, the coating liquid 3m containing the hydrophilic compound, the acid gas carrier and water is coated to form the coated membrane, and the coated membrane is dried, when necessary, to obtain the acid gas separation composite membrane 1 provided with the facilitated transport membrane 3 on the hydrophobic porous body 2a (FIG. 1B).

First, the hydrogel-state coating liquid 3m containing at least the hydrophilic compound (hydrophilic polymer), the acid gas carrier and water is prepared.

The hydrophilic compound functions as a binder, and when the hydrophilic compound is used in the acid gas separating layer, the hydrophilic compound retains moisture to exhibit a function of separating the acid gas by the acid gas carrier. From viewpoints of dissolution into water to have a capability of formation of the coating liquid, and the acid gas separating layer having high water absorptivity (moisture retention), the hydrophilic compound preferably has high water absorptivity, and preferably absorbs water in a mass 1.5 times or more and 1,000 times or less, based on a mass of the hydrophilic compound per se.

From viewpoints of water absorptivity, membrane-forming properties, strength and so forth, the hydrophilic compound is preferably a hydrophilic polymer. For example, polyvinyl alcohol-polyacrylate and a polyvinyl alcohol-polyacrylic acid (PVA-PAA) copolymer, polyvinyl alcohol, polyacrylic acid, polyacrylate, polyvinylbutyral, poly-N-vinylpyrrolidone, poly-N-nilacetamide and polyacrylamide are preferred, and a PVA-PAA copolymer is particularly preferred. The PVA-PAA copolymer has high water absorptivity, and also even during high water absorption, strength of the hydrogel is high. A content of the polyacrylate in the PVA-PAA copolymer is, for example, preferably 5 mol % or more and 95 mol % or less, and further preferably 30 mol % or more and 70 mol % or less. Specific examples of the polyacrylate include alkali metal salt such as sodium salt and potassium salt, and also, ammonium salt and organic ammonium salt. Specific examples of a commercially available PVA-PAA copolymer include Kurastomer AP20 (trade name: manufactured by Kuraray Co., Ltd.).

The acid gas carrier includes various kinds of water-soluble compounds having affinity with the acid gas (for example, a carbon dioxide gas) to show basicity, and means a substance that indirectly reacts with the acid gas, or a substance per se that directly reacts with the acid gas. Specific examples of the former include a substance that reacts with other gases contained in a fed gas to show basicity, in which the resultant basic compound reacts with the acid gas. More specifically, the acid gas carrier means such an alkali metal compound that reacts with a water vapor to release $OH^-$, in which the resultant $OH^-$ reacts with $CO_2$ to allow selective incorporation of $CO_2$ into the membrane. Specific examples of the latter include such a substance per se being basic as a nitrogen-containing compound and sulfur oxide.

Here, specific examples of the acid gas include carbon dioxide ($CO_2$), hydrogen sulfide, carbonyl sulfide, sulfur oxides ($SO_x$) and nitrogen oxides ($NO_x$), and hydrogen halide such as hydrogen chloride.

In the embodiment, specific examples of the acid gas carrier include an alkali metal compound, a nitrogen-containing compound and sulfur oxide.

Specific examples of the alkali metal compound include at least one kind selected from alkali metal carbonate, alkali metal bicarbonate and alkali metal hydroxide. Here, as an alkali metal, an alkaline metal element selected from cesium, rubidium, potassium, lithium and sodium is preferably used.

In addition, the alkali metal compound herein is used in the meaning of not only the alkali metal per se, but also including salt thereof and ion thereof.

Specific examples of the alkali metal carbonate preferably include lithium carbonate, sodium carbonate, potassium carbonate, rubidium carbonate and cesium carbonate.

Specific examples of the alkali metal bicarbonate preferably include lithium hydrogen carbonate, sodium hydrogen carbonate, potassium hydrogen carbonate, rubidium hydrogen carbonate and cesium hydrogen carbonate.

Specific examples of the alkali metal hydroxide preferably include cesium hydroxide and rubidium hydroxide.

Above all, alkali metal carbonate is preferred, and a compound containing cesium or rubidium is preferred. Moreover, two or more kinds of acid gas carriers may be mixed and used. Specific examples preferably include a mixture of cesium carbonate and potassium carbonate.

As a content of the acid gas carrier in the coating liquid $3m$, although a level depends on a ratio to an amount of the hydrophilic compound or a kind of the acid gas carrier, from a viewpoint of exhibition of a function as the acid gas carrier and excellent stability as the acid gas separating layer under a use environment, the content is preferably 0.1 mass % or more and 30 mass % or less, further preferably 0.2 mass % or more and 20 mass % or less, and particularly preferably 0.3 mass % or more and 15 mass % or less.

The coating liquid $3m$ is obtained, for example, by adding water to the hydrophilic compound while the resultant mixture is stirred, and subsequently adding an aqueous solution of the acid gas carrier thereto, sufficiently stirring the resultant mixture to prepare an aqueous solution containing 2.5 mass % of the hydrophilic compound being the water-soluble polymer and 6.0 mass % of a carbon dioxide carrier promoter, and the solution is degassed.

The coating liquid $3m$ may contain other components (additives) other than the hydrophilic compound, the acid gas carrier and water within the range in which separation characteristics are not adversely affected. Specific examples of the components that may be arbitrarily used include a gelling agent that controls so-called settability to cool a coated membrane to cause gelation in a process of coating onto the porous body an aqueous solution (coating liquid) for formation of the acid gas separating layer, the aqueous solution containing the hydrophilic compound and the acid gas carrier, and drying the coated material, a viscosity regulator for adjusting viscosity during coating upon coating the above-described coating liquid by using a coating apparatus, a crosslinking agent for improving membrane strength of the acid gas separating layer, an acid gas absorption promoter, and in addition thereto, a surfactant, a catalyst, an auxiliary solvent and a membrane strength regulator, and also a detecting agent for facilitating a test on existence or nonexistence of defects in the formed acid gas separating layer.

If the above-described hydrophobic porous body $2a$ is the hydrogel having the elastic modulus in the range of 0.01 MPa to 100 MPa (conditions of the elastic modulus are as already described) even under the environment in operation as the module for acid gas separation, the hydrophobic porous body $2a$ can suppress clogging of pores by the facilitated transport membrane material and intrusion of the facilitated transport membrane material into the porous support, and can maintain high gas separation performance even under a use environment of high pressure and high humidity. Accordingly, the coating liquid is desirably prepared such that a composition satisfying the above-described conditions of the elastic modulus in the facilitated transport membrane is adjusted to form a hydrogel coating liquid having a viscosity of 0.1 Pa·s to 5.0 Pa·s, also including utilization of the above-described additives.

A method for applying the coating liquid onto the hydrophobic porous body $2a$ having the above-described fibril structure is not particularly limited, and a conventionally known method can be adopted. Specific examples of the conventionally known application method include a curtain flow coater, an extrusion die coater, an air doctor coater, a blade coater, a rod coater, a knife coater, a squeeze coater, a reverse roll coater and a bar coater. In particular, from viewpoints of membrane thickness uniformity, an amount of coating and so forth, an extrusion die coater is preferred. When the facilitated transport membrane is a laminated membrane having a plurality of layers, a sequential coating method or a simultaneous multilayer coating method may be adopted. The coating liquid $3m$ is applied onto the hydrophobic porous body $2a$ by applying these application methods, and the facilitated transport membrane having 5 μm or more and 200 μm or less can be formed, and the facilitated transport membrane having, preferably, 10 μm or more and 150 μm or less, and further preferably 15 μm or more and 130 μm or less can be formed.

The facilitated transport membrane 3 obtained is a hydrogel-state membrane, and contains at least the hydrophilic compound, and the acid gas carrier that reacts with the acid gas inside the gas to be separated. The facilitated transport membrane 3 can separate the gas to be separated, the gas having a high temperature of about 130° C. and containing water vapor, and has the heat and moisture resistance.

As described above, the acid gas separation composite membrane 1 can be produced by coating, onto the surface of the hydrophobic porous body 2a provided with the three-dimensional network structure 200 formed of a plurality of fibrils and a large number of pores formed of microscopic interstices 203 divided by the plurality of fibrils, the coating liquid 3m of the facilitated transport membrane 3. The three-dimensional network structure 200 is formed to be 0.001 µm or more and 2 µm or less in the average inter-fibril distance x inside the plane in parallel to the plane that forms the facilitated transport membrane, 0.01 µm or more and 2 µm or less in the average fibril length y, and 0.001 µm or more and 2 µm or less in the average inter-fibril distance z in the direction perpendicular to the surface. If the hydrophobic porous body 2a having such structure is used, permeation of the hydrogel-state coating liquid 3m into the support by the capillary force, and nonuniformization on the surface of the coated membrane are suppressed, and the facilitated transport membrane 3 having high surface uniformity can be formed. Accordingly, according to the production method of the present embodiment, the acid gas separation composite membrane 1 having satisfactory durability under the high temperature, high humidity and high pressure environment can be produced.

Figure 3:
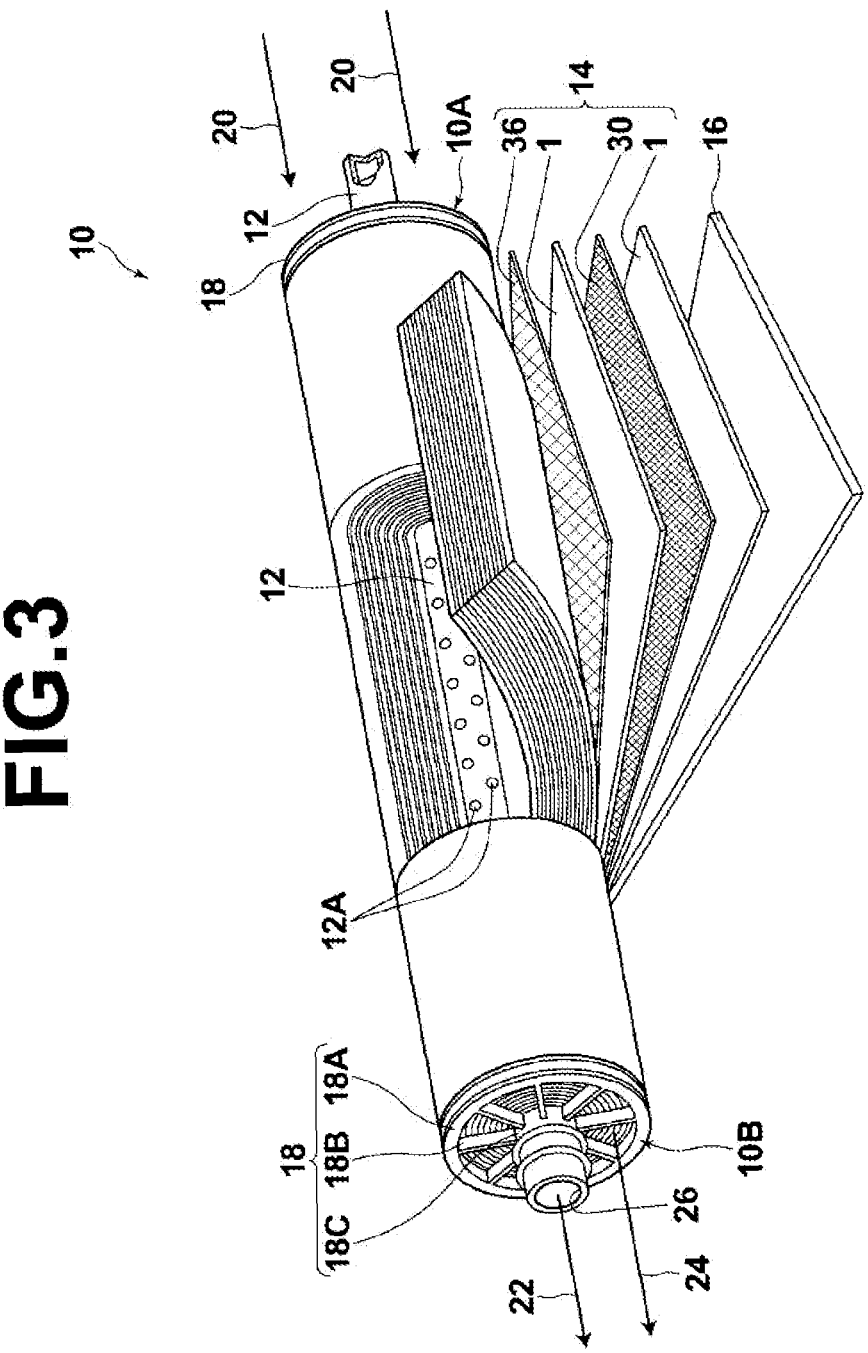
FIG. 3 is a partially cut-away schematic structural view showing one embodiment of a module for acid gas separation of the present disclosure.

As described above, the facilitated transport membrane 3 can be preferably used in the module for acid gas separation to be used under the high pressure and high humidity environment. A kind of the module 10 for gas separation is not particularly limited, and a module having a known shape such as a flat membrane type, a spiral type and a pleated type can be used, but the spiral type shown in FIG. 3 is particularly preferred. The spiral type module has structure in which a structure having a facilitated transport type gas separation membrane is spirally wound around a perforated hollow central tube, and housed. The spiral type module is preferred in view of a capability of producing the module having a significantly large area of the separation membrane per module. A spiral type module for gas separation is described below, referring to FIG. 3.

"Spiral Type Module for Acid Gas Separation"

FIG. 3 is a partially cut-away schematic structural view showing one embodiment of a spiral type module of the modules for acid gas separation to which the acid gas separation composite membrane shown in FIG. 1 can be preferably applied. The module for acid gas separation is the facilitated transport type module for acid gas separation that separates the fed gas to be separated into the acid gas and the remaining gas other than the acid gas and discharges the resultant gases.

As shown in FIG. 3, the module 10 for acid gas separation separates a fed gas 20 to be separated into a transmitted gas (acid gas) 22 and a remaining gas 24 other than the transmitted gas and discharges the resultant gases. As basic structure thereof, the module 10 is structured such that, in a state in which a singular laminate 14 or plural laminates 14 are wound around a transmitted gas collecting tube 12, an outermost periphery of the laminate 14 is covered with a covering layer 16, and telescope prevention plates 18 are attached to both ends of these units, respectively. In the module 10 for acid gas separation, the module 10 having such structure, if the gas 20 to be separated and containing the acid gas is fed to the laminate 14 from a side of an end portion 10A, the gas 20 to be separated is separated into the acid gas 22 and the remaining gas 24 by structure of the laminate 14 to be described later to discharge the resultant gases separately to a side of the other end portion 10B.

The transmitted gas collecting tube 12 is a cylindrical tube in which a plurality of through-holes 12A are formed on a tube wall thereof. A tube on a side of one end portion (one end portion 10A side) of the transmitted gas collecting tube 12 is closed, and a tube on a side of the other end portion (the other end portion 10B side) is opened to serve as a discharge port 26 through which the acid gas 22 such as carbon dioxide that is transmitted through the laminate 14 and is collected from the through-holes 12A is discharged.

A shape of the through-holes 12A is not particularly limited, but 1 to 20 mmϕ-circular holes are preferably opened. Moreover, the through-holes 12A are preferably uniformly arranged on a surface of the transmitted gas collecting tube 12.

The covering layer 16 is formed of a shutoff material that may shut off the gas 20 to be separated that passes through an inside of the module 10 for acid gas separation. The shutoff material preferably further has the heat and moisture resistance. Here, "heat resistance" of the heat and moisture resistance means that the material has heat resistance of 80° C. or higher. Specifically, the heat resistance of 80° C. or higher means that, even after the material is stored for 2 hours under temperature conditions of 80° C. or higher, a form before storage is maintained, and no visually confirmable curling due to thermal shrinkage or thermal fusion occurs. Moreover, "moisture resistance" of the heat and moisture resistance means that, even after the material is stored for 2 hours under conditions of 40° C. and 80% RH, the form before storage is maintained, and no visually confirmable curling due to thermal shrinkage or thermal fusion occurs.

The telescope prevention plate 18 has an outer periphery annular portion 18A, and an inner periphery annular portion 18B and a radial spoke portion 18C, and each is preferably formed of a heat and moisture-resistant material.

The laminate 14 is structured such that, a member 30 for fed gas flow channel is interposed inside the acid gas separation composite membrane 1 folded into two, and in an inside in a radial direction, the acid gas separation composite membrane 1 is subjected to adhesion onto a member 36 for transmitted gas flow channel through a sealed portion 34S (sealed portion 4 in FIG. 1) permeated thereto, and sealed.

The number of sheets of laminates 14 to be wound around the transmitted gas collecting tube 12 is not particularly limited and may be singular or plural, but a membrane area of the acid gas separation composite membrane 1 can be increased by increasing the number of sheets (number of lamination). Thus, an amount of the acid gas 22 that can be separated by one module can be increased. Moreover, in order to increase the membrane area, a length of the laminate 14 may be further increased.

Moreover, when the number of sheets of laminates 14 is plural, the number is preferably 50 or less, further preferably 45 or less, and still further preferably 40 or less. If the number is the specified number or less, the laminate 14 can be easily wound therearound, and processing adaptability is improved.

A width of the laminate 14 is not particularly limited, but is preferably 50 mm or more and 100,000 mm or less, further preferably 60 mm or more and 50,000 mm or less, and still further preferably 70 mm or more and 30,000 mm or less.

Further, from a viewpoint of practical use, the width of the laminate 14 is still further preferably 200 mm or more and 2,000 mm or less. The width is adjusted to each lower limit or more. Thus, even if coating (sealing) by the resin is caused, an effective membrane area of the acid gas separation composite membrane 1 can be secured. Moreover, the width is adjusted to an upper limit or less. Thus, horizontality of a winding core can be kept, and occurrence of winding deviation can be suppressed.

Figure 4:
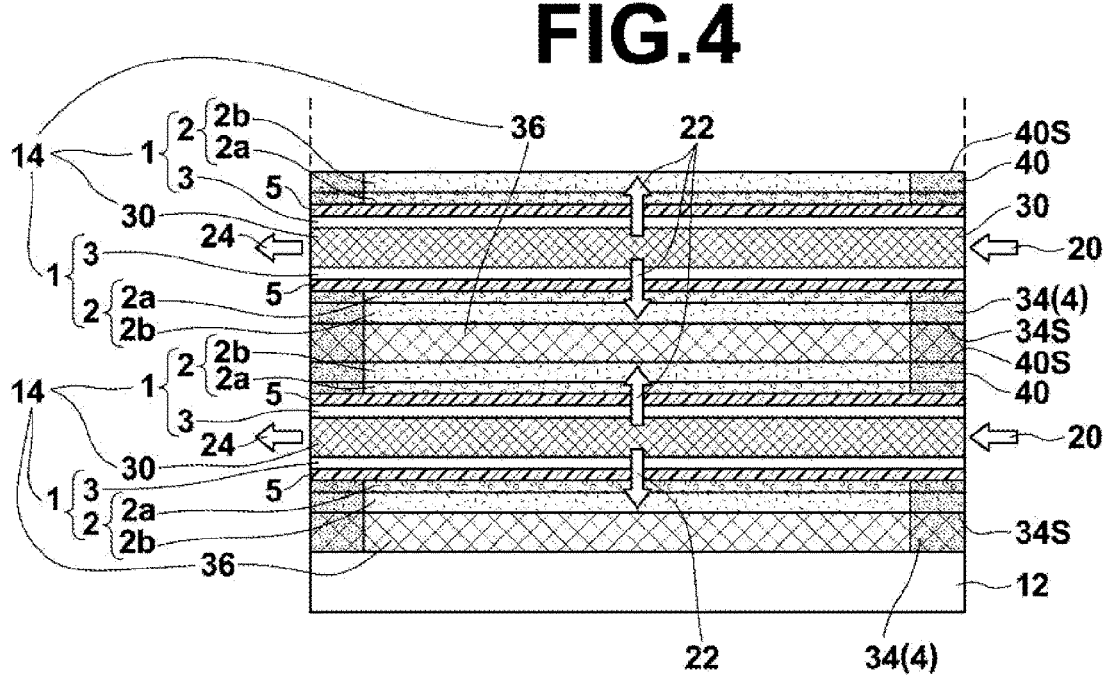
FIG. 4 is a cross-sectional view showing part of cylindrical wound body in which a laminate is wound around a transmitted gas collecting tube.

FIG. 4 is a cross-sectional view showing part of cylindrical wound body in which a laminate is wound around a transmitted gas collecting tube. As shown in FIG. 4, the laminates 14 are subjected to adhesion to each other through a sealed portion 40S that is permeated into the acid gas separation composite membrane 1, and stacked around the transmitted gas collecting tube 12. Specifically, in the laminate 14, a member 36 for transmitted gas flow channel, an acid gas separation composite membrane 1, a member 30 for fed gas flow channel and the acid the gas separation composite membrane 1 are laminated sequentially from a side of the transmitted gas collecting tube 12. Owing to the lamination, the gas 20 to be separated, the gas 20 containing the acid gas 22, is fed from an end portion of the member 30 for fed gas flow channel, the acid gas 22 that is transmitted through the acid gas separation composite membrane 1 divided by the covering layer 16 and separated is accumulated into the transmitted gas collecting tube 12 through the member 36 for transmitted gas flow channel and the through-holes 12A, and is recovered from the discharge port 26 connected to the transmitted gas collecting tube 12. Moreover, the remaining gas 24 from which the acid gas 22 is separated, and which passes through pores in the member 30 for fed gas flow channel or the like is discharged from the member 30 for fed gas flow channel on a side on which the discharge port 26 is provided and an end portion of the acid gas separation composite membrane 1 in the module 10 for acid gas separation.

Figure 5:
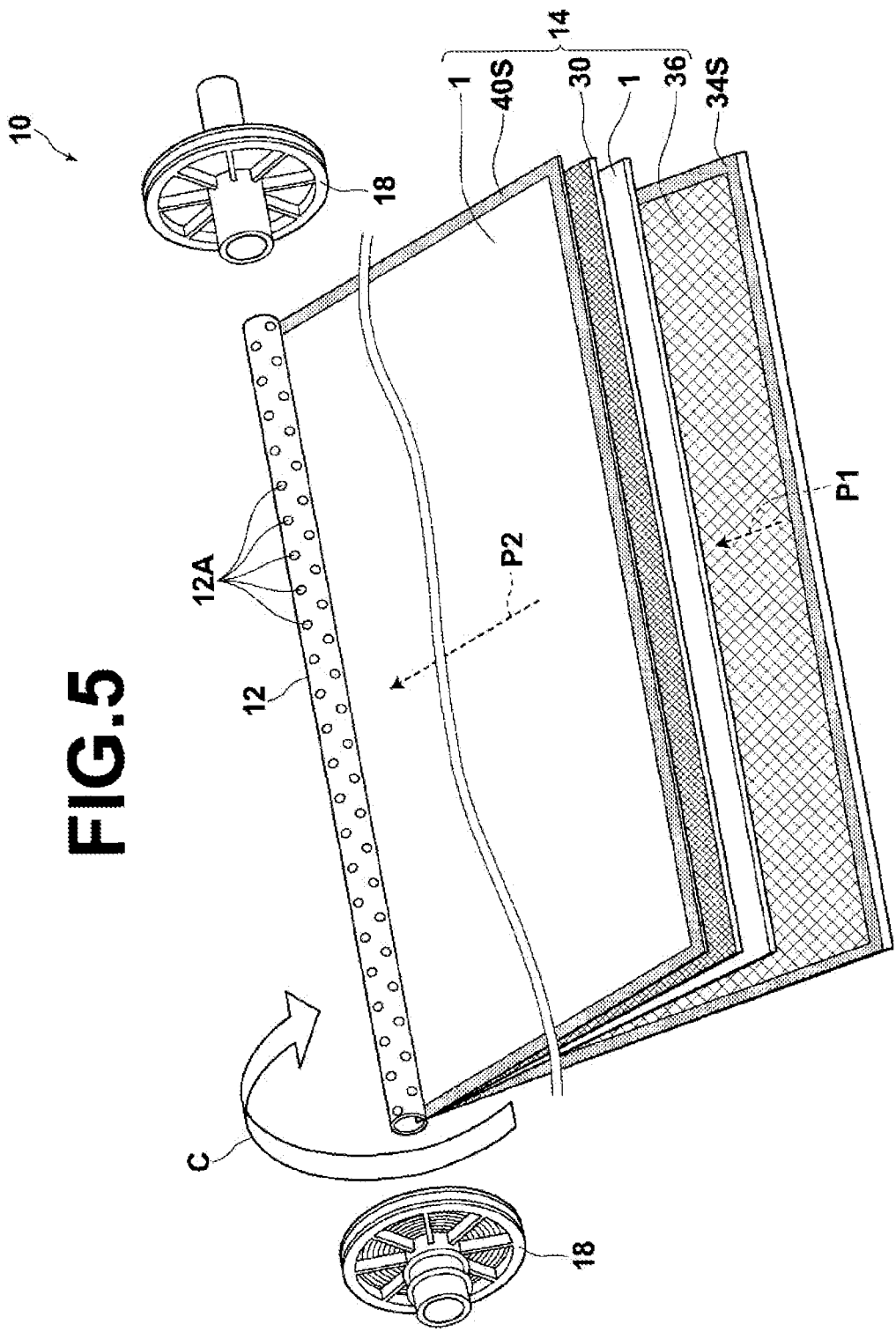
FIG. 5 is a schematic view showing a state before a laminate is wound around a transmitted gas collecting tube.

FIG. 5 is a diagram showing a state before a laminate is wound around a transmitted gas collecting tube, and the view showing one embodiment of formation regions of a sealed portion 34S and a sealed portion 40S. As shown in FIG. 5, the sealed portion 40S covers the through-holes 12A with the member 36 for transmitted gas flow channel, and in a state in which the laminate 14 is wound around the transmitted gas collecting tube 12 in an arrow C direction in the figure, the sealed portion 40S causes adhesion of the acid gas separation composite membrane 1 onto the member 36 for transmitted gas flow channel, and simultaneously seals both. Meanwhile, the sealed portion 34S causes adhesion of the acid gas separation composite membrane 1 onto the member 36 for transmitted gas flow channel, and simultaneously seals both, before the laminate 14 is wound around the transmitted gas collecting tube 12.

Both the sealed portion 34S and the sealed portion 40S are formed into a so-called envelope form in which an end portion in a circumferential direction between the acid gas separation composite membrane 1 at winding start, and the member 36 for transmitted gas flow channel is opened. Then, in a region surrounded by the sealed portion 34S, a flow channel P1 is formed through which the acid gas 22 transmitted through the acid gas separation composite membrane 1 flows into the through-holes 12A. In a similar manner, in a region surrounded by the sealed portion 40S, a flow channel P2 is formed through which the acid gas 22 transmitted through the acid gas separation composite membrane 1 flows into the through-holes 12A.

Each element of the module for acid gas separation is similar to a constituent of the above-mentioned laminate for acid gas separation. In the present module for acid gas separation, as the structure of the laminate, the module includes the member 30 for fed gas flow channel. As the member 30 for fed gas flow channel, a member similar to the member for transmitted gas flow channel can be used.

In the facilitated transport membrane 3, the moisture contained in the membrane is oozed out onto the porous support 2 to increase wettability of the porous support 2, or to draw the resin due to surface tension thereof. Thus, the resins of the sealed portion 34S and the sealed portion 40S are easily infused into the pores in the porous support 2 through the member 36 for transmitted gas flow channel. Therefore, even if the sealed portions (34S, 40S) in the circumferential direction are not formed by an injection and sealing method, strong adhesion force between the sealed portion 34S and the sealed portion 40S is obtained by an ordinary coating method, and as a result, gas leak can be suppressed.

In the module 10 for acid gas separation, the resins of sealed portions 34S, 40S are not particularly limited, as long as the resins cause no reduction of sealability by operation. However, if feeding of the gas 20 to be separated, the gas 20 containing water vapor, at a high temperature is assumed, the resins preferably have moisture and heat resistance. Specific examples of the preferred resin include an epoxy resin, a vinyl chloride copolymer, a vinyl chloride-vinyl acetate copolymer, a vinyl chloride-vinylidene chloride copolymer, a vinyl chloride-acrylonitrile copolymer, a butadiene-acrylonitrile copolymer, a polyamide resin, polyvinylbutyral, polyester, a cellulose derivative (nitrocellulose), a styrene-butadiene copolymer, various kinds of synthetic rubber resins, a phenolic resin, a urea resin, a melamine resin, a phenoxy resin, a silicon resin and a urea-formamide resin.

A method for producing the module 10 for acid gas separation is described below.

FIG. 6A to FIG. 6C are drawings of a process for producing a module for acid gas separation. In the method for producing the module 10 for acid gas separation, first, as shown in FIG. 6A, a leading end portion of an elongated member 36 for transmitted gas flow channel is fixed to a tube wall (outer periphery) of the transmitted gas collecting tube 12 by a fixing member 55 such as a Kapton tape or an adhesive. Here, a slit (not shown) is preferably provided on the tube wall along a shaft direction. In the above case, the leading end portion of the member 36 for transmitted gas flow channel is put into the slit, and fixed to an inner periphery of the transmitted gas collecting tube 12 by the fixing member 55. According to the above structure, upon winding around the transmitted gas collecting tube 12 the laminate 14 containing the member 36 for transmitted gas flow channel, even if winding is made while tension is applied, no slip out of the member 36 for transmitted gas flow channel is caused from the slit due to friction between the inner periphery of the transmitted gas collecting tube 12 and the member 36 for transmitted gas flow channel, more specifically, fixing of the member 36 for transmitted gas flow channel is maintained.

Next, as shown in FIG. 6B, the elongated member 30 for fed gas flow channel is interposed into a space formed in the elongated acid gas separation composite membrane 1 folded into two by internally placing the acid gas separating layer 3. In addition, upon folding into two the acid gas separation composite membrane 1, the acid gas separation composite membrane 1 may be divided into two as shown in FIG. 6B, but may be folded into two in a shifted manner.

Next, onto one outer surface (surface of an auxiliary support 2b of the porous support 2) of outer surfaces of the acid gas separation composite membrane 1 folded into two, the adhesive 34 is coated onto a crosswise end portion and a longitudinal end portion of the membrane (coated in the envelope form). Thus, the sealed portion 34S is formed. Before the adhesive is coated, treatment using the organic solvent is applied, as described on the laminated membrane.

Next, as shown in FIG. 6C, onto a surface of the member 36 for transmitted gas flow channel, the member 36 being fixed to the transmitted gas collecting tube 12, the acid gas separation composite membrane 1 interposing the member 30 for fed gas flow channel is pasted through an adhesive 40. In addition, upon pasting the acid gas separation composite membrane 1 thereonto, the membrane is pasted such that one end onto which no adhesive 40 is coated is located on a side of the gas collecting tube 12. Thus, the sealed portion 34S as a whole is formed into a shape in which the end portion in the circumferential direction is opened between the acid gas separation composite membrane 1 at winding start, and the member 36 for transmitted gas flow channel, and in a region surrounded by the sealed portion 34S, the flow channel P1 is formed through which the acid gas 22 transmitted through the acid gas separation composite membrane 1 flows into the through-holes 12A.

Next, onto a surface of the acid gas separation composite membrane 1 pasted onto the member 36 for transmitted gas flow channel (surface of the auxiliary support 2b of the porous support 2 on a surface reverse to the surface onto which the composite membrane 1 is pasted), the adhesive 40 is coated onto a crosswise end portion and a longitudinal end portion of the membrane. Before the adhesive is coated, treatment using the organic solvent is also applied herein. Thus, the adhesive 40 is permeated into the auxiliary support 2b and the hydrophobic porous body 2a, a second sealed portion 40S is formed, and the laminate 14 is formed.

Figure 7:
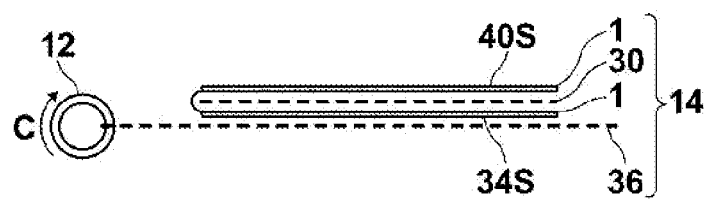
FIG. 7 is a diagram showing s process for producing a spiral type module.

Subsequently, as schematically shown in FIG. 7, the transmitted gas collecting tube 12 is rotated in an arrow C direction. Thus, the laminate 14 is wound around the transmitted gas collecting tube 12 in a multiple manner so as to cover the through-holes 12A with the member 36 for transmitted gas flow channel. On the above occasion, the laminate 14 is preferably wound therearound while tension is applied to the laminate 14.

Figure 8:
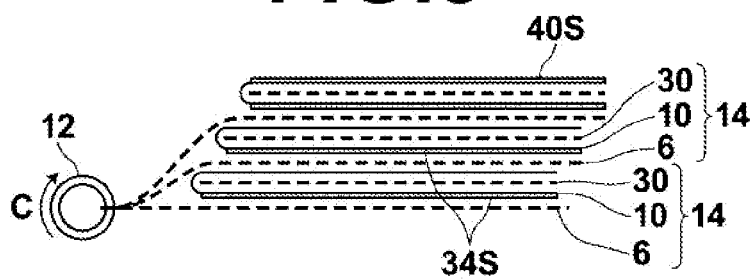
FIG. 8 is a diagram showing a modified example of a process for producing a spiral type module.

In addition, one obtained by interposing the member 30 for fed gas flow channel into the space formed in the acid gas separation composite membrane 1 folded into two is taken as one unit, and the unit and the member 36 for transmitted gas flow channel are alternately laminated. As a result, as shown in FIG. 8, a plurality of the laminates 14 are stacked (by three layers in the present example), and may be wound around the transmitted gas collecting tube in the multiple manner.

The cylindrical wound body is obtained by passing through the steps described above, and both end portions of the cylindrical wound body obtained is subjected to trimming (end face correction processing), and then an outermost periphery of the cylindrical wound body is covered with the covering layer 16, and the telescope prevention plates 18 are attached onto both ends. Thus, the module 10 for acid gas separation shown in FIG. 3 is obtained.

Details of each structure of the module 10 for acid gas separation are described below.

<Member for Transmitted Gas Flow Channel>

As the member 36 for transmitted gas flow channel, a net-shaped member is preferred so as to have a function as a spacer, and a function of flowing a transmitted acid gas inwardly from the member for transmitted gas flow channel, and also a function of allowing permeation of the resin. As a material of the member 36 for transmitted gas flow channel, a material similar to the material of the porous body can be used. Moreover, if flowing of the gas 20 to be separated, the gas containing water vapor, at a high temperature is assumed, the member 36 for transmitted gas flow channel also preferably has the heat and moisture resistance.

Specific examples of raw materials of the member 36 for transmitted gas flow channel further preferably include a polyester base such as epoxy-impregnated polyester, a polyolefin base such as polypropylene and a fluorine base such as polytetrafluoroethylene.

A thickness of the member 36 for transmitted gas flow channel is not particularly limited, but is preferably 100 μm or more and 1,000 μm or less, further preferably 150 μm or more and 950 μm or less, and still further preferably 200 μm or more and 900 μm or less.

The member 36 for transmitted gas flow channel serves as a flow channel of the acid gas transmitted through the acid gas separation composite membrane 1, and therefore preferably has low resistance. Specifically, the member 36 desirably has high porosity, only limited deformation upon applying pressure, and a small pressure loss. The porosity is preferably 30% or more and 95% or less, further preferably 35% or more and 92.5% or less, and still further preferably 40% or more and 90% or less. In addition, the porosity can be measured as described below. First, water is sufficiently infused into a pore portion of the member for transmitted gas flow channel by utilizing ultrasonic wave or the like, and an excessive amount of moisture on the surface is removed, and then a mass per unit area is measured. A value obtained by subtracting the mass from a dry mass is a volume of water introduced into the pores in the member for transmitted gas flow channel, and is converted using water density, and thus an amount of pores, and eventually the porosity can be measured. On the above occasion, when water is insufficiently infused thereinto, the porosity can be measured also by using a solvent having low surface tension, such as an alcohol base.

The deformation upon applying pressure can be approximated by elongation upon conducting a tensile test, and the elongation upon applying a load of 10 N/10 mm width is preferably within 5%, and further preferably within 4%.

Moreover, the pressure loss can be approximated by a flow rate loss of compressed air that is flowed at a constant flow rate, and upon flowing the compressed air at 15 L/min through a 15 cm-square member 36 for transmitted gas flow channel at room temperature, the compressed air has a loss preferably within 7.5 L/min, and further preferably within 7 L/min.

<Fed Gas Flow Channel Member>

The member 30 for fed gas flow channel is a member to which the gas 20 to be separated, the gas 20 containing the acid gas, is fed, and the member preferably has a function as a spacer, and causes turbulence for the gas 20 to be separated, and thus a net-shaped member is preferably used. A gas flow channel changes depending on a shape of the net. Thus, the shape of a unit lattice of the net is selected from a shape such as a rhombus and a parallelogram according to the purpose, and used. As a material of the member 30 for fed gas flow channel, a material similar to the material of the porous body can be used. Moreover, if flowing of the gas 20 to be separated, the gas 20 containing water vapor, at a high temperature is assumed, the member 30 for fed gas flow channel also preferably has the heat and moisture resistance.

A thickness of the member 30 for fed gas flow channel is not particularly limited, but is preferably 100 μm or more and 1,000 μm or less, further preferably 150 μm or more and 950 μm or less, and still further preferably 200 μm or more and 900 μm or less.

As described above, the present disclosure is described on a specific embodiment in detail, but the present disclosure is not limited to such an embodiment, and it is apparent to those skilled in the art that other various embodiments can be formed within the scope of the present disclosure.

EXAMPLE

The present disclosure is described in more detail based on Examples below.

Example 1

<Preparation of Coating Liquid Composition for Carbon Dioxide Separating Layer>

Water was added to a polyvinyl alcohol-polyacrylic acid copolymer (Kurastomer AP-20: trade name, manufactured by Kuraray Co., Ltd.) while stirring was continued. Next, a cesium carbonate aqueous solution (solid concentration: 40 mass %) was added thereto, the resultant mixture was sufficiently stirred under conditions of a temperature of 25° C. to prepare an aqueous solution in which a concentration of the polyvinyl alcohol-polyacrylic acid copolymer being a water-soluble polymer was 2.5 mass %, and a concentration of cesium carbonate being a carbon dioxide carrier was 6.0 mass %, and the solution was degassed to obtain a coating liquid composition (1) for forming a carbon dioxide separating layer.

<Preparation of Support>

A porous body having an average inter-fibril distance x, an average fibril length y, an average inter-fibril distance z in a membrane thickness direction and an average fibril diameter r for each described in Table 1 was arranged. An inter-fibril distance, a fibril length and a fibril diameter of the support was analyzed using surface SEM. On the above occasion, the inter-fibril distance, the fibril length and the fibril diameter of each were measured to calculate an average value. Moreover, with regard to the inter-fibril distance in a z direction, measurement was carried out on cross-sectional SEM to calculate an average value in a manner similar to the above-mentioned method. A thickness of a porous body into which a reinforcing agent was incorporated was adjusted to 200 μm for all.

<Formation of Carbon Dioxide Separating Layer>

On a surface of the porous body, the prepared coating liquid composition for forming the carbon dioxide separating layer was applied using a roll coater, and dried by passing the resultant material through a drying zone maintained at 60° C. to prepare a carbon dioxide separation composite membrane. An application rate was adjusted to 10 m/min, and a drying temperature (warm air temperature in the drying zone) was adjusted to 60° C.

Uniformity of the prepared composite membrane was evaluated using a laser microscope. A gel membrane on an outermost surface was photographed in 0.1 mm². A case of no pore-like material observed was taken as A in a membrane surface evaluation. Moreover, a case of 1 to 5 pieces of pore-like defects observed in the above-described range was taken as B, a case of 6 to 10 pieces observed was taken as C, a case of 11 to 99 pieces observed was taken as D, and a case of 100 pieces or more was taken as E.

<Preparation of Spiral Type Carbon Dioxide Separation Membrane Module>

The gas separation composite membrane 1 for carbon dioxide separation as obtained was folded into two by internally placing a carbon dioxide separating layer. A Kapton tape was attached onto a valley portion of the membrane folded into two to reinforce the membrane so as for an end portion of a fed gas flow channel material to cause no damage on a surface state of the valley portion of the composite. Then, a 0.5 mm-thick net made from polypropylene was interposed as a fed gas flow channel material into a space formed in the carbon dioxide separating layer of the membrane folded into two. An adhesive (manufactured by Henkel Japan Ltd., E120HP: trade name) formed of an epoxy resin having high viscosity (about 40 Pa·s) was applied thereon to be in an envelope form on a side of an auxiliary support of the laminate, a tricot-knitted transmitted gas flow channel material made from epoxy-impregnated polyester was stacked, and the resultant material was wound around a perforated hollow central tube in a multiple manner to prepare a spiral type carbon dioxide separation membrane module.

<Evaluation of Life of Coated Membrane>

As a test gas, a raw material gas: $H_2:CO_2:H_2O=45:5:50$ (flow rate: 2.2 L/min) was fed to each acid gas separation module at a temperature of 130° C. and a total pressure of 301.3 kPa to flow an Ar gas (flow rate: 0.6 L/min) on a transmission side. A transmitted gas was analyzed by gas chromatograph to calculate initial values of a $CO_2$ transmission rate ($P(CO_2)$) and a $CO_2/H_2$ separation factor ($\alpha$). Moreover, measurement was continued for 50 hours under identical conditions, and rates of change of $P(CO_2)$ and $\alpha$ were calculated.

On the above occasion, a case of less than 10% in both rates of change of $P(CO_2)$ and $\alpha$ was taken as A, a case of 10% or more and less than 15% in the both rates was taken as B, a case of 15% or more and less than 20% in the both rates was taken as C, a case of 20% or more and less than 40% in the both rates was taken as D, and a case of 40% or more in the both rates was taken as E.

<Evaluation of Module Performance>

As to an evaluation of performance of each prepared acid gas separation module, a He gas was filled on a feed side, and then the module was sealed, and the evaluation was performed by measuring a period of time during which pressure decreased from 0.34 MPa to 0.3 MPa. A case of 1,000 seconds or more in a time needed for decrease was taken as Good, and a case of less than 1,000 seconds in the time was taken as POOR.

<Criteria of Comprehensive Evaluation>

The above-described three kinds of evaluation experiments were performed, and as a comprehensive evaluation, judgement from A to E was made based on the following criteria. A to C were taken as an evaluation in which the problem of the present disclosure was solvable, and D and E were taken as an evaluation in which the problem of the present disclosure was unsolvable.

Specifically, the evaluation was performed as described below.

A case of A in the membrane defects (membrane surface), A in the life, and GOOD in the module performance was taken as Comprehensive evaluation A, a case of A or B in the membrane defects, A or B in the life, and GOOD in the module performance was taken as Comprehensive evaluation B, a case of C in the membrane defects, C in the life, and GOOD in the module performance was taken as Comprehensive evaluation C, a case of D in either the membrane defects or the life, and POOR in the module performance was taken as Comprehensive evaluation D, and a case of D or E in the membrane defects, D or E in the life, and POOR in the module performance was taken as Comprehensive evaluation E.

The results are shown in Table 1. As shown in Table 1, effectiveness of the present disclosure was shown.

TABLE 1

| | INTER-FIBRIL DISTANCE x (μm) | AVERAGE FIBRIL LENGTH y (μm) | INTER-FIBRIL DISTANCE IN Z DIRECTION z (μm) | FIBRIL DIAMETER r (μm) | EVALUATION | | | |
|---|---|---|---|---|---|---|---|---|
| | | | | | MEMBRANE SURFACE | LIFE | MODULE PERFORMANCE | COMPREHENSIVE EVALUATION |
| EXAMPLE 1 | 1.00 | 1.00 | 0.50 | 0.30 | A | A | GOOD | A |
| EXAMPLE 2 | 1.00 | 1.50 | 0.50 | 0.10 | A | A | GOOD | A |
| EXAMPLE 3 | 0.50 | 0.50 | 1.00 | 0.10 | A | A | GOOD | A |
| EXAMPLE 4 | 0.50 | 0.01 | 0.50 | 0.10 | A | A | GOOD | A |
| EXAMPLE 5 | 0.01 | 0.10 | 0.50 | 0.10 | A | A | GOOD | A |
| EXAMPLE 6 | 0.05 | 0.01 | 0.01 | 0.10 | A | A | GOOD | A |
| EXAMPLE 7 | 1.00 | 1.80 | 1.00 | 0.10 | B | B | GOOD | B |
| EXAMPLE 8 | 1.80 | 1.00 | 1.00 | 0.10 | B | A | GOOD | B |
| EXAMPLE 9 | 1.00 | 1.00 | 1.90 | 0.10 | B | B | GOOD | B |
| EXAMPLE 10 | 1.00 | 2.00 | 0.50 | 0.10 | B | B | GOOD | B |
| EXAMPLE 11 | 2.00 | 2.00 | 0.50 | 0.10 | B | B | GOOD | B |
| EXAMPLE 12 | 1.00 | 2.00 | 2.00 | 0.10 | B | B | GOOD | B |
| EXAMPLE 13 | 2.00 | 2.00 | 2.00 | 0.20 | B | B | GOOD | B |
| EXAMPLE 14 | 1.00 | 1.50 | 1.00 | 0.008 | C | C | GOOD | C |
| COMPARATIVE EXAMPLE 1 | 1.50 | 2.50 | 1.50 | 0.10 | D | C | POOR | D |
| COMPARATIVE EXAMPLE 2 | 2.50 | 1.50 | 1.00 | 0.20 | D | C | POOR | D |
| COMPARATIVE EXAMPLE 3 | 1.50 | 1.50 | 2.20 | 0.10 | C | D | POOR | D |
| COMPARATIVE EXAMPLE 4 | 1.50 | 3.00 | 2.50 | 0.008 | E | E | POOR | E |

What is claimed is:

1. A method for producing an acid gas separation composite membrane provided with, on a support having a hydrophobic porous body at least on one surface, a facilitated transport membrane containing at least a hydrophilic compound and an acid gas carrier that reacts with an acid gas inside a gas to be separated, comprising;

arranging of the hydrophobic porous body having three-dimensional network structure formed through intersecting, coupling or branching of a plurality of fibrils, and a large number of pores formed of microscopic interstices divided by the plurality of fibrils, in which, in the three-dimensional network structure, an average inter-fibril distance inside a plane in parallel to a surface having the facilitated transport membrane of the support is 0.001 μm or more and 2 μm or less, an average fibril length inside the plane is 0.01 μm or more and 2 μm or less, and an average inter-fibril distance in a direction perpendicular to the surface is 0.001 μm or more and 2 μm or less, preparing of a hydrogel-state coating liquid containing at least the hydrophilic compound and the acid gas carrier, and applying of the coating liquid onto one surface of the hydrophobic porous body.

2. The method for producing the acid gas separation composite membrane according to claim 1, wherein an average fibril diameter of the plurality of fibrils is 0.01 μm or more and 5 μm or less.

3. The method for producing the acid gas separation composite membrane according to claim 1, wherein a contact angle between water and the one surface of the hydrophobic porous body is 100 degrees or more.

4. The method for producing the acid gas separation composite membrane according to claim 1, wherein the hydrophobic porous body is composed of a fluorine-based resin.

5. The method for producing the acid gas separation composite membrane according to claim 4, wherein the fluorine-based resin is polytetrafluoroethylene.

6. The method for producing the acid gas separation composite membrane according to claim 1, wherein the coating liquid is applied onto the one surface of the hydrophobic porous body through a hydrophobic intermediate layer having gas permeability.

7. The method for producing the acid gas separation composite membrane according to claim 6, wherein the intermediate layer is a silicone resin layer.

8. A facilitated transport type module for acid gas separation for separating a fed gas to be separated into an acid gas and a remaining gas other than the acid gas and discharge the resultant gases, comprising;

a member for fed gas flow channel through which the gas to be separated and the remaining gas are transmitted, an acid gas separation composite membrane produced by the method for producing the acid gas separation composite membrane according to claim 1, and a member for transmitted gas flow channel through which the acid gas that is resulted from a reaction with the acid gas carrier and transmitted through the acid gas separation composite membrane flows.

* * * * *